Figure 1:
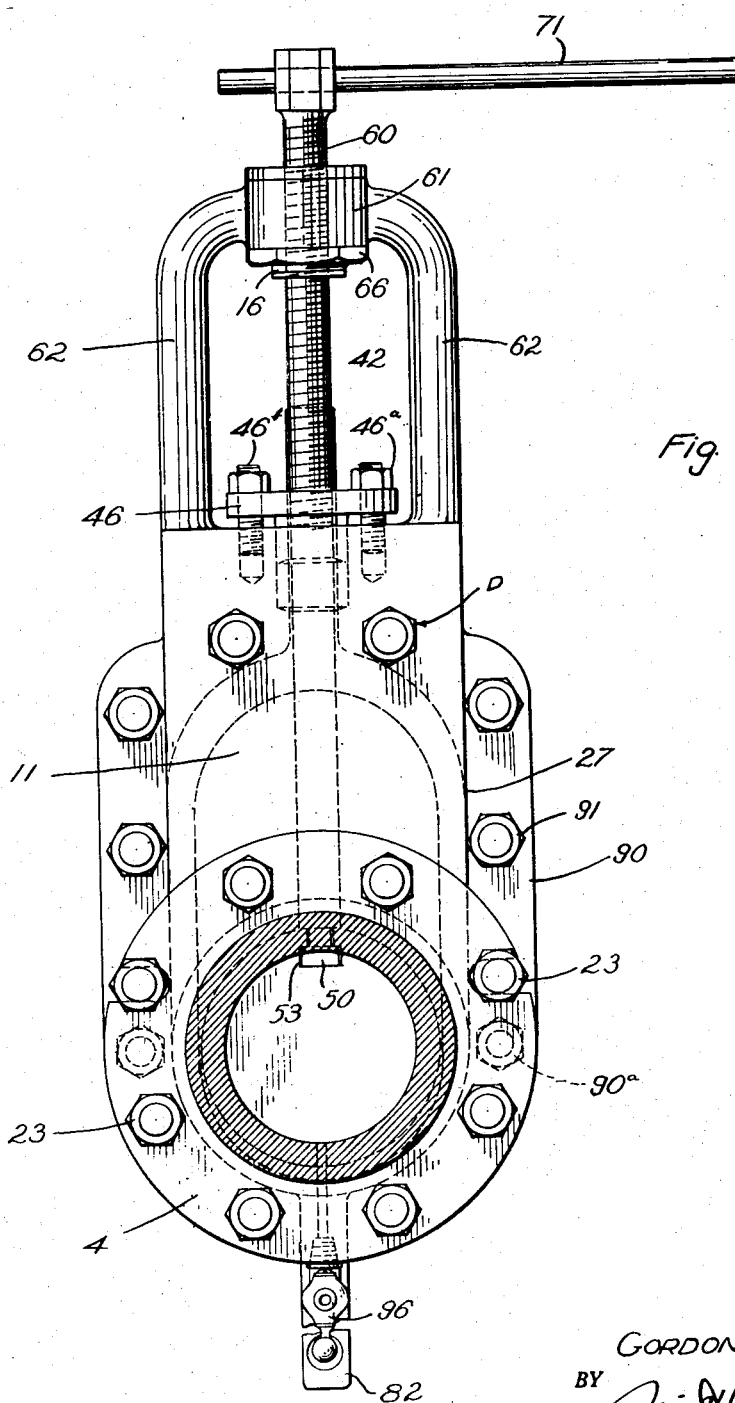

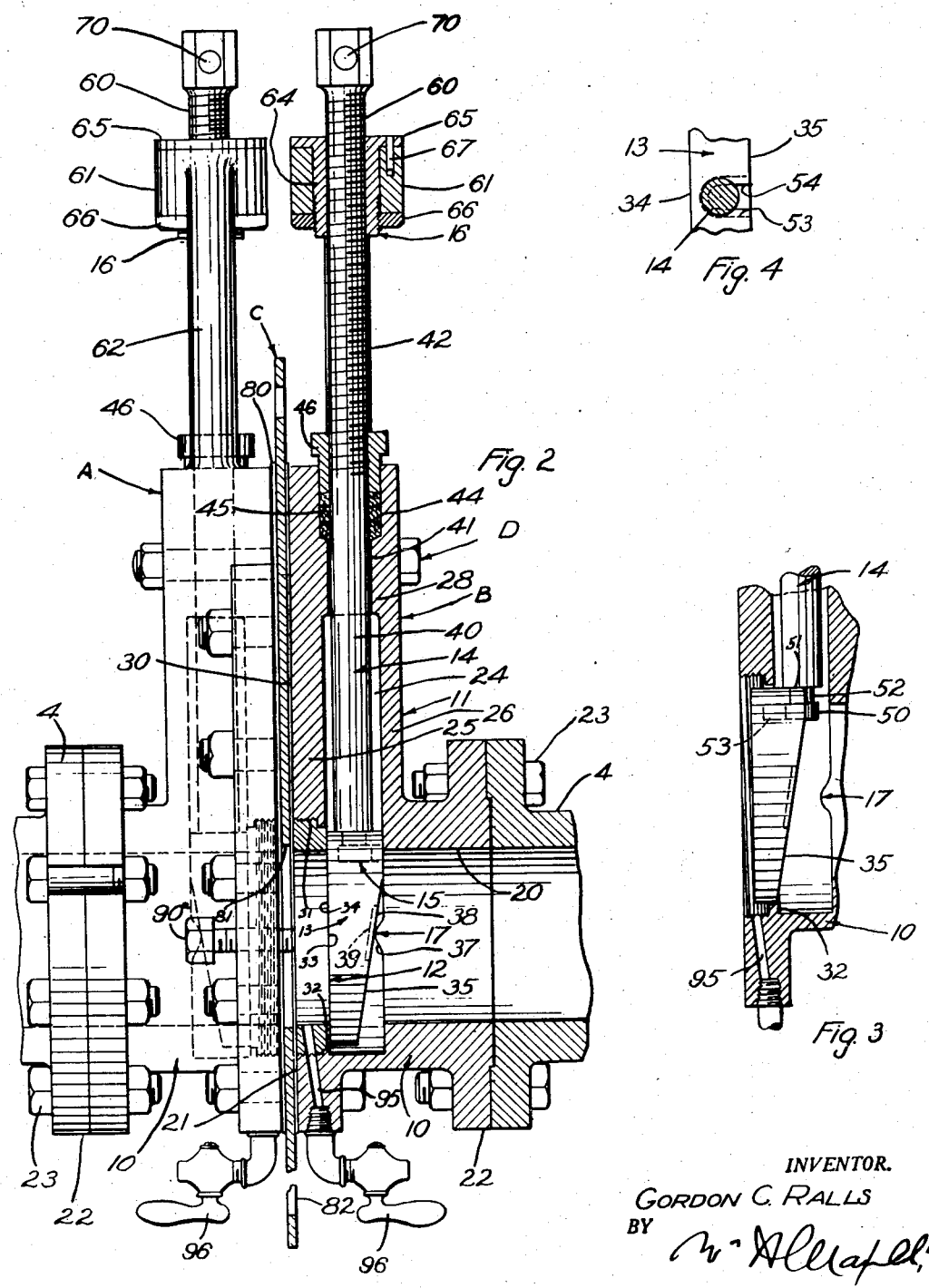

Patented Mar. 7, 1950

2,499,415

UNITED STATES PATENT OFFICE 2,499,415

FLOW CONTROL

Gordon C. Ralls, Martinez, Calif.

Application July 9, 1945, Serial No. 603,853

22 Claims. (Cl. 277—67)

1

This invention relates to a flow control and it provides a unit in the nature of a gate valve and further provides for a combination of such units forming a line blind, it being a general object of the invention to provide a simplified and improved unit in the nature of a gate valve and to provide a simple, practical, combination of such units in connection with a plate to form a fitting such as a line blind or orifice fitting.

The usual gate valve involves a cast body formed in two sections, a main section and a bonnet, such construction being necessary, generally, to enable introduction of the gate or the seats, or both. Such construction is necessarily expensive as it involves joints and coupling means to connect the separately formed parts and it gives rise to the possibility of misalignment or leakage. Furthermore, such construction generally makes for a fairly large, cumbersome and heavy construction highly undesirable and inconvenient in many situations.

It is common where line blinds or orifice plates are employed to incorporate them in special devices known as line blinds or orifice fittings, and to provide such device in a line in combination with gate valves, usually two gate valves, one at either side of the blind or orifice plate. Such conventional or common construction makes it necessary to provide two conventional gate valves which are expensive and cumbersome and it necessitates the introduction of a third expensive, cumbersome unit between the gate valves.

It is a general object of my present invention to provide a device or unit in the nature of a gate valve and which is of simplified, improved construction.

Another object of the invention is to provide a device or unit of the character just referred to which is extremely simple, compact, and inexpensive of manufacture.

Another object of the invention is to provide a unit of the character referred to wherein the body can be advantageously cast or otherwise formed as a single, integral unit making it unnecessary to provide sections such as characterize the ordinary gate valve.

It is another object of my present invention to provide a unit of the general character referred to wherein there is a removable seat that can be removed from the unit through the fluid passage established by the unit.

It is another object of my invention to provide a simple, effective means for making the gate tight against the seat. By my present invention the gate of the structure is cammed or wedged

2 into seating engagement with the seat, thus assuring a tight fit between these parts.

It is a further object of my invention to provide a structure such as I have referred to involving a unique, simple yet effective coupling between the gate and its operating stem. By my construction the gate is coupled to the stem by being moved laterally into engagement therewith and when it is coupled and the valve structure is in operating condition, it is impossible for the gate to become disengaged from the stem.

It is a further object of the present invention to provide a structure of the general character just referred to which is such that the gate proper can be removed through the flow passage when the seat referred to has been removed. With the construction that I have provided the seat is insertable as a separate part through one end of the valve body rather than through a bonnet such as is ordinarily the case with a gate valve, and when the seat is removed the gate is shiftable longitudinally of the structure so that it can be moved into and out of position to cooperate with the seat when the seat is arranged in place.

Another object of my present invention is to provide a combination of units such as I have just referred to which form a fitting for handling a plate with a line blinding plate or an orifice plate. The construction that I have provided makes it unnecessary to employ a separate and special body construction for a plate but rather the valve units themselves are coupled in a manner to form or to establish a holder for the plate.

Another object of my present invention is to provide a construction or assembly such as I have just referred to which is compact and extremely simple both of construction and operation. The arrangement that I have provided occupies a minimum amount of length in a pipe line and it is such that the plate, whether a blinding plate or an orifice plate, can be arranged in place or removed through the simple operation of a few bolts which serve to couple the valve units, it being possible to insert and remove the plate without completely severing the connection between the units.

The various objects and features of my invention will be fully understood from the following detailed description of a typical preferred form and application of the invention, throughout which description reference is made to the accompanying drawings, in which:

Fig. 1 is an end elevation of the construction provided by my invention. Fig. 2 is a side view of an assembly provided by my invention including two valve units forming a carrier for a plate, the valve unit at the left being shown in elevation and the one at the right being shown in vertical central section, except for the gate and its operating stem. Fig. 3 is a view similar to a portion of the structure shown at the right in Fig. 2, except that the units at the right has been detached from the other parts and the seat thereof has been removed and the gate thereof is shown in a position partially removed from its operating stem, and Fig. 4 is a transverse sectional view through the lower end portion of the operating stem taken immediately above the point where it connects with the gate and showing a portion of the gate.

My present invention provides primarily a gate unit in the nature of a gate valve and it provides various improvements and simplifications in such a construction. and my invention further provides a plurality of units in the nature of gate valves combined or incorporated to form a holder for a plate such as a line blinding plate or an orifice plate. In the preferred embodiment of my invention which I have illustrated in the drawings and which is best seen in Fig. 2 of the drawings I provide a unitary structure including two gate units A and B, a plate C, and means D joining or coupling the units A and B with a plate C between them so that the entire assembly forms a unit suitable for insertion in a pipe line to establish therein a plate with a blinding plate or an orifice plate with a control gate at each side of the plate. I will first describe one gate unit, it being understood that the two units A and B may be alike and that therefore the description is applicable to both.

The gate unit of the present invention involves, generally, a body including a main portion 10 and a lateral extension 11, a removable seat 12 carried in the main section of the body to present a seat face at a chamber which intersects the passage through the body and which continues into the body extension 11, a gate 13 operable in the said chamber and adapted to be moved into and out of position where it cooperates with the seat 12, a stem 14 entering the body through the extension 11, means 15 releasably connecting the gate with the stem, means 16 for operating the stem to move the gate in the said chamber, means 17 for forcing the gate against the seat as it reaches position to cooperate with the seat and various other factors and details all of which will appear from the following description.

The body which is the main or principal part of the gate unit is preferably a single unitary casting involving the main section 10 and an extension 11. The main section 10 in the preferred form of the invention is a tubular element forming a fluid passage 20 adapted to handle flow from a line or other structure to which the device may be connected. For most purposes the main section 10 is formed so that the fluid passage 20 is a straight, round passage corresponding in size to that of the pipe line to which the fitting is to connect. The main section 10 has a flat finished inner end 21 normal to the axis of the passage 20 and the main section 10 is provided at its outer end with means for making connection with a pipe line or the like. In the case illustrated I have shown the section 10 provided at its outer end with a flange 22 to facilitate connection with a line L through suitable bolts 23. It is to be understood, of course, that any suitable form of connection may be employed without departing from the present invention.

The extension 11 of the body projects laterally from the main section 10 and is located at the inner end portion of the body. The extension 11 establishes a laterally disposed chamber 24 which is somewhat wider than the passage 20 and continues across the passage 20 so that it, in effect, intersects the passage forming an opening in the body to accommodate and guide the gate 13 so that the gate can be moved within the body into and out of position where it closes or intersects the passage. The extension, as shown in the drawings, may include flat inner and outer side walls 25 and 26, respectively, which are disposed in planes normal to the axis of the passage 20 and it may have end walls 27 and a top wall 28. The several walls of the chamber are preferably integrally joined and form a completely enclosed chamber 24, projecting laterally from the passage 20 sufficient to receive the gate so the gate is completely removed from the passage. The outer side or face 30 of the wall 25 is preferably finished and joins and forms a continuation of the finished flat inner end 21 of the main section 10 of the body.

The seat 12 is, in accordance with my invention, arranged in the main section 10 of the body from one end thereof. In the arrangement illustrated the seat is arranged in the section 10 from its inner end. The section 10 has a threaded counterbore 31 entering it from the flat inner end 21 which counterbore terminates at a stop shoulder 32. The seat 12 is an annular or ring-like element having its outer periphery threaded so that it can be screw threaded into the counterbore 31. The bore or inside diameter of the seat is the same diameter as the pipe or passage 20. The seat ring is formed to thread into the counterbore until it seats against the stop shoulder 32 and the inner end portion of the ring continues past the stop shoulder to enter the chamber 25 where the seat ring is provided with a finished seating face 33 disposed in a plane normal to the passage 20. In the preferred construction the outer end of the seat is flush with the inner end of the main section 10 of the body when the seat is in operating position. In practice I make the counterbore considerably larger in diameter than the passage 20 and I make the stop shoulder 32 only large enough to effectively stop inward movement of the seat ring so that the opening in the main section 10 from its inner end which accommodates the seat ring and which communicates with the lateral or transverse chamber 24 is considerably larger in diameter than the passage 20.

The gate 13 which I have provided is designed to operate in the chamber 24 and when it is in operating position it extends across the passage 20 and cooperates with the seat ring 12 as shown in the unit B in Fig. 2. The forward face 34 of the gate is finished so that it is flat and in a plane normal to the axis of the passage 20 and, therefore, is such as to seat against the seating face 33 of the seat 12. The gate is made round or in the form of a disc and its diameter is made slightly less than that of the opening which extends into the main section 10 from the inner end to the chamber 24. With this relationship of parts the gate 13 can be moved into and out of the chamber by being shifted axially of the passage 20 when the seat 12 is removed.

In accordance with the preferred form of my invention I pitch or bevel the rear side 35 of the gate disc so that the gate is tapered or pitched downward to be considerably narrower at its lower end than at its upper end.

The means 17 which I have provided for forcing the gate against the seat acts to cam or wedge the gate into engagement with the seat when the gate is lowered into closed position. The preferred form of the means 17 involves cam projections 37 in the body to project into the chamber 24 at diametrically opposite sides of the passage 20 to engage finished parts 38 at diametrically opposite points at the rear of the gate. The finished parts 38 may be on inserts 39 of suitable heat or wear taking material. By locating the cam parts 37 at diametrically opposite points the gate is engaged at opposite points and is forced uniformly toward the seat 12 upon being forced down in the chamber 24 between the gate and the cam parts. The stem 14 that I have provided is an elongate member in the form of a rod or bar, preferably round in cross section, and having a lower section 40 which is plain or smooth to slidably enter the chamber 24 through a bore 41 provided in the top 28 of the extension 11. The lower section 40 of the stem extends down in the chamber to the gate 13. The upper section 42 of the stem projects a substantial distance above the extension 11 to accommodate the operating means 16, as will be hereinafter described.

In accordance with the preferred form of my invention I provide for packing around the stem where it enters the extension 11. In the case illustrated I have shown a counterbore 44 in the top 28 of the extension to carry a body of packing 45 and a follower 46 is arranged to enter the counterbore to compress the packing around the stem. Nuts 46ᵃ carried on suitable studs 46ᵇ engage the follower to operate it.

The means 15 which I have provided for releasably connecting the stem with the gate is such as to be engaged and disengaged through lateral movement of the gate relative to the stem. I provide a head 50 beyond the lower end 51 of the stem and connect the head to the stem by a reduced neck 52. I provide a socket 53 in the upper portion of the gate 13 from its rear side 35 which socket I make large enough to receive the head 50. I provide a notch or channel 54 in the gate extending from the socket 53 to the top of the gate and proportion the channel to accommodate the neck 52 which couples the head 50 with the stem. Through the construction just described the head 50 is in position to receive the gate 13 when it is lowered to a position shown in the unit B in Fig. 2, and when the seat 12 is removed the gate 13 can be moved axially through the opening in the inner end of section 10 so that the head 50 enters the socket 51 while the neck 52 is received in the channel 54. When the gate is thus engaged with the stem the seat can be arranged in place and thereafter the gate cannot become disengaged from the stem until the seat is removed and the gate is effectively connected with the stem so that the stem is free to rotate relative to the gate and so that the gate is moved vertically with the stem.

The means 16 provided for operating the stem vertically, as shown in the drawings, includes a screw thread 60 formed on the upper section 42 of the stem and a head 61 mounted above the body extension 11 to cooperate with the threaded portion of the stem. In the particular case illustrated the head 61 is supported above the extension 11 on spaced legs 62 which extend upwardly from the extension 11 and a threaded bushing 64 is provided in the head to carry the stem. The bushing 64 is retained in the head by a flange 65 at one end and a nut 66 threaded to its other end. A lock pin 67 holds the bushing against rotation. The upper end of the stem is formed so that it can be advantageously engaged by a wrench, a hand wheel or any suitable operating tool. In the drawings I have shown it polygonal in form and provided with a transverse opening 70 for the reception of an operating bar 71, or the like. With the construction just described rotation of the stem causes it to move longitudinally, that is, up or down, due to its threaded engagement with the bushing 64 of the head 61. When the stem is moved to a down position as it is shown in the drawings, the gate 13 carried at the lower end of the stem is in closed position or in seated engagement with the seat 12. When the stem is operated to an up position it is elevated and the gate 13 is moved out of the passage 20 and into the chamber 24.

It is common to incorporate in a fluid line an assembly consisting of a pair of gate valves with a line blind fitting therebetween. This is done because a single valve alone may not be reliably used in place of a line blind, due to the possibility that the valve may allow fluid leakage. A single valve and a line blind adjacent thereto are effective for blinding a line only when the blind is on the downstream side of the valve. If the flow should be reversed after installation of the valve and blind, the latter would be on the upstream side impractical if not impossible to operate and not be operated without considerable loss of fluid. It is, therefore, customary to utilize a pair of valves with a line blind therebetween.

In using the conventional arrangement of a blind fitting between two gate valves the procedure is to first close both valves and then to insert the blind plate across the line into the blind fitting formed to receive it. In performing this operation substantially all of the fluid between the two valve gates is lost. When two conventional gate valves and a conventional blind fitting are used there is a considerable distance between the closures of the two valves and consequently a considerable amount of fluid is lost in the course of the blinding operation. In many cases the loss of such a quantity of fluid is critical and may create a fire hazard or expose the operator to great danger.

By using two of the simple compact valves heretofore described in abutting relation to a line blind disc or plate, I not only decrease or minimize the distance between the closures of the valves and, hence, the fluid lost in the course of a blinding operation, but I am able to substitute this entire structure or unit in the line space ordinarily occupied by a single conventional gate valve. With my construction the distance between the closures and consequently the loss of fluid may be reduced to approximately one tenth of that resulting with the conventional construction. If it is desired or necessary to install a double gate valve and a blind in a line in place of an ordinary gate valve, it is not necessary to resort to expensive alteration or modification of the line to do so, since the unitary structure that I have provided may be installed in the place of any conventional gate valve without other line alterations.

In accordance with my invention I incorporate a plate C with the two gate units A and B by providing the coupling means D which joins or ties the units A and B together with the plate between them. In the arrangement illustrated in the drawings and as best seen in Fig. 2 I provide the plate C between the opposed inner ends of the gate units A and B and in practice I may employ a plain, flat plate and I may introduce sealing means such as gaskets 80 between the sides of the plate and the inner ends of the gate units. The plate C may be an orifice plate or it may be a blinding plate which completely closes passage through the structure. In the drawings I have shown a plate having an opening 81 forming a full passage or opening through the structure and I have shown upper and lower extensions 82 on the plate by which it can be conveniently manipulated between the gate units A and B.

The means D serves to couple or tie the gate units A and B together so that they can be clamped tightly onto the plate C or, if desired, so they can be clamped directly together without the plate between them.

The particular means D illustrated in the drawings is a bolted connection involving flanges 90 on the inner or adjoining ends of the bodies of the gate units A and B and a plurality of bolts 91 which extend between the flanges 90 and are adapted to be tightened to draw or clamp the units A and B tightly together or toward each other. It will be observed that the flanges 90 continue or extend around the main sections 10 of the units A and B and also along the outer part of the extensions 11. It is preferred in practice, to locate the bolts 91 in the flanges 90 as close as possible to the passage 20 through the sections 10, and in practice I employ as many bolts as pressure conditions or the structural formation require. Jack screws 90ᵃ may be threaded in one flange 90 to abut or engage the other flange 90 to separate the flanges when necessary.

When the gate units A and B are assembled with a plate C between them, small chambers or cavities occur between the plate, if it is a blinding plate, and the gates of the units A and B. To test for leakage I may provide drain openings 95 from these small chambers or cavities and may provide suitable control fittings 96 in connection with the drain openings.

From the foregoing description it will be apparent that I have provided a valve or gate unit which is simple, inexpensive, and compact and at the same time dependable and effective in operation. Likewise it will be apparent that I have provided an assembly or combined construction wherein a plate such as a blinding plate or orifice plate can be advantageously incorporated between two gate units providing a simple, inexpensive and compact unitary structure.

My construction, by providing a seat removable through one end of the flow passage of a gate unit, permits of the gate proper, or closure, being arranged in or removed from the structure through the flow passage, making it unnecessary to provide the device with the expensive, cumbersome, bonnet construction common to structures of this character.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A valve including a unitary body having a main section with a straight flow passage through it from one end to the other and a lateral extension with a gate receiving chamber, a removable seat mounted in the flow passage of the body from one end of the main section to have a seating face at the chamber, a gate operable in the body into and out of engagement with the seat, the outside diameter of the gate being smaller than the portion of the flow passage in which the seat is mounted, and means for moving the gate between a position where it engages the seat and a retracted position in the chamber including a stem entering the body and a releasable connection between the stem and gate, said connection being releasable by lateral shifting of the gate relative to the stem and comprising only an integral extension of the stem cooperating with a socket in the gate, the gate being releasable from the stem and removable through the passage when the seat is removed from the body.

2. Flow controlling apparatus including, a blind plate, two like gate units with tubular flow conducting portions with their inner ends engaging opposite sides of the plate, flanges at the inner ends of the units projecting beyond the margin of the plate and being substantially coextensive therewith, releasable means connecting the flanges operable to clamp the plate between the units, and a jack screw cooperating with the flanges when the said means is released to spread the units from the gate.

3. In a structure of the character described, a flow controlling plate, a flow controlling gate, a tubular body carrying the plate and the gate and including two relatively movable sections with pipe coupling means at their outer ends, one body section being a gate section having a laterally disposed gate receiving chamber defined at one end by a flat wall located at the inner end of said section, said wall being disposed in a plane normal to the axis of the body and having a flow opening therethrough, the other body section having an inner end opposed to and spaced from the exterior of said wall axially of the body, the gate being operable in the chamber and closing against the interior of said wall and the plate being engaged between the body sections and with the inner ends thereof, and means operating the body sections relative to each other to clamp them to the plate.

4. In a structure of the character described, a flow controlling plate, a flow controlling gate, a tubular body carrying the plate and the gate and including two relatively movable sections with pipe coupling means at their outer ends, one a gate section having a laterally disposed gate receiving chamber defined at one end by a flat wall located at the inner end of said section, said wall being disposed in a plane normal to the axis of the body and having a flow opening therethrough, the other body section having an inner end opposed to and spaced from the exterior of said wall axially of the body, the gate being operable in the chamber and closing against the interior of said wall and the plate being engaged between the body sections and with the inner ends thereof, and means operating the body sections relative to each other to clamp them to the plate, the gate having a tapered face engaging and cooperating with a part in the chamber to force the gate into sealing engagement with said wall.

5. In a structure of the character described, a flow controlling plate, a flow controlling gate, a tubular body carrying the plate and the gate and including two relatively movable sections with pipe coupling means at their outer ends, one a gate section having a laterally disposed gate receiving chamber defined at one end by a flat wall located at the inner end of said section, said wall being disposed in a plane normal to the axis of the body and having a flow opening therethrough, the other body section having an inner end opposed to and spaced from the exterior of said wall axially of the body, the gate being operable in the chamber and closing against the interior of said wall and the plate being engaged between the body sections and with the inner ends thereof, and means operating the body sections relative to each other to clamp them to the plate, said wall having a removable annular liner defining the said flow opening and engaged by the plate and by the gate, said liner being larger in outside diameter than the gate.

6. In a structure of the character described, a flow controlling plate, a flow controlling gate, a tubular body carrying the plate and the gate and including two relatively movable sections with pipe coupling means at their outer ends, one a gate section having a laterally projecting gate receiving chest and a laterally disposed gate receiving chamber in communication with the chest and defined at one end by a flat wall located at the inner end of said section, said wall being disposed in a plane normal to the axis of the body and having a valve seat with a flow opening therethrough and engageable at the inner side of said wall, the other body section having an inner end opposed to and spaced from the exterior of said wall axially of the body, the gate being operable in the chamber and closing against the seat at the inner side of said wall and the plate being engaged between the body sections and by the inner ends thereof, and means operating the body sections relative to each other to clamp them to the plate, the chest having flat opposed side walls between which the gate is received with only working clearance.

7. In a structure of the character described, a flow controlling plate, a flow controlling gate, a tubular body carrying the plate and the gate and including two relatively movable sections with pipe coupling means at their outer ends, one a gate section having a laterally projecting gate receiving chest and a laterally disposed gate receiving member in communication with the chest and defined at one end by a flat wall located at the inner end of said section, said wall being disposed in a plane normal to the axis of the body and having a flow opening therethrough, the other body section having an inner end opposed to and spaced from the exterior of said wall axially of the body, the gate being operable in the chamber and closing against the interior of said wall and the plate being engaged between the body sections and by the inner ends thereof, and means operating the body sections relative to each other to clamp them to the plate, said wall having a removable annular liner defining the said flow opening and engaged by the plate and by the gate, said liner being larger in outside diameter than the gate, the chest having flat opposed side walls between which the gate is received with only working clearance.

8. In a structure of the character described, a flow controlling plate, a flow controlling gate, a tubular body carrying the plate and the gate and including two relatively movable sections with pipe coupling means at their outer ends, one a gate section having a laterally projecting chest and a laterally disposed gate receiving chamber communicating with the chest and defined at one end by a flat wall located at the inner end of said section, said wall being disposed in a plane normal to the axis of the body and having a flow opening therethrough, the other body section having an inner end opposed to and spaced from the exterior of said wall axially of the body, the gate being operable in the chamber and closing against the interior of said wall and the plate being engaged between the body sections and with the inner ends thereof, an operating stem entering the gate section through the chest, and hook means releasably coupling the stem and gate, the said wall having a removable annular liner portion defining said opening and engaged by the gate and by the plate, the liner being larger in outside diameter than the gate, the hook means being released by movement of the gate through said wall when the liner of the wall is removed therefrom.

9. A line blind valve unit including, a body member having a substantially straight flow passageway therethrough and coupling means at its outer ends, blinding means carried by the body member intermediate its ends and including a plate movable between open and closed positions to seal off the passageway, laterally disposed gate recesses in the body on opposite sides of the blinding means and immediately adjacent thereto and communicating with the passageway, each recess being separated from the plate by a single flat wall engaged by the plate and disposed in a plane normal to the passageway, gate members retractible into the recesses and movable therefrom to positions engaging said walls and closing off the passageway, and means for effecting movement of the gates between their two positions.

10. In a structure of the character described, a flow controlling plate, a flow controlling gate, a tubular body carrying the plate and the gate and including two relatively movable sections with pipe coupling means at their outer ends, one a gate section having a laterally disposed gate receiving chamber defined at one end by a flat wall located at the inner end of said section, said wall being disposed in a plane normal to the axis of the body and having a flow opening therethrough, the other body section having an inner end opposed to and spaced from the exterior of said wall axially of the body, the gate being operable in the chamber and closing against the interior of said wall, the plate being engaged between the body sections and by the inner ends thereof, means operating the body sections toward each other to clamp them to the plate, and jack screws carried by the body operating to spread the body sections apart to free the plate for removal.

11. A line blind valve unit comprising a pair of like relatively movable gate valves each having a body with a flow passageway therethrough, a gate recess communicating with and extending laterally with respect to said passageway, a gate retractable into said recess and movable therefrom to a position closing off said passageway, each valve having a flat inner end wall defining one side of the recess and having a plain flat outer face opposing the other valve, said face extending from below said passageway to above said gate recess, said valves being arranged with their passageways in alignment and with said flat outer faces opposed, a plate arranged between said flat faces and confined thereby, and means connecting the said inner and walls so the plate is releasably clamped between said faces.

12. A line blind valve unit comprising a pair of like relatively movable gate valves each having a body with a flow passageway therethrough, a gate recess communicating with and extending laterally with respect to said passageway, a gate retractible into said recess and movable therefrom to a position closing off said passageway, each valve having a flat inner end wall defining one side of the recess and having a plain flat outer face opposing the other valve, said face extending from below said passageway to above said gate recess, said valves being arranged with their passageways in alignment and with said flat outer faces opposed, a plate arranged between said flat faces and confined thereby, and means connecting the said inner end walls so the plate is releasably clamped between said faces, said end walls having peripheral flange portions encompassing the passageways and recesses and carrying the said means.

13. A line blind valve unit comprising a pair of like relatively movable gate valves each having a body with a flow passageway therethrough, a gate recess communicating with and extending laterally with respect to said passageway, a gate retractible into said recess and movable therefrom to a position closing off said passageway, each valve having a flat inner end wall defining one side of the recess and having a plain flat outer face opposing the other valve, said face extending from below said passageway to above said gate recess, annular seats carried by the said inner walls and engaged by the gate, said valves being arranged with their passageways in alignment and with said flat faces opposed, a plate arranged between said flat faces and confined thereby, and means connecting the said inner end walls so the plate is releasably clamped between said faces, the seats being detachable from the said walls and having outer ends coterminous with the said faces of the walls.

14. In a structure of the character described, two like relatively movable valve units, a plate confined between the units, each unit including, a body with a tubular flow conducting portion, coupling means at the outer end of said tubular portion, a flat inner end wall normal to the axis of said portion and having an outer side engageable with the plate, and a flow controlling gate shiftable laterally of said tubular portion and engaging the inner side of said wall, and means connecting the valve units together and operating to clamp said walls to the plate.

15. In a structure of the character described, two like relatively movable valve units, a plate confined between the units, each unit including, a body with a tubular flow conducting portion, coupling means at the outer end of said tubular portion, a flat inner end wall normal to the axis of said portion and having an outer side engageable with the plate, a flow controlling gate shiftable laterally of said tubular portion and engaging the inner side of said wall, a gate receiving chest projecting laterally from the tubular portion and closed at its inner end by said wall, an operating stem extending parallel with said end wall and into the chest and carrying the gate in substantial alignment therewith, and means connecting the valve units together and operating to clamp said walls to the plate.

16. In a structure of the character described, two like relatively movable valve units, a plate confined between the units, each unit including, a body with a tubular flow conducting portion, coupling means at the outer end of said tubular portion, a flat inner end wall normal to the axis of said portion and having an outer side engageable with the plate, and a flow controlling gate shiftable laterally of said tubular portion and engaging the inner side of said wall, the wall having a removable annular insert larger in outside diameter than the gate and engaged by the plate and by the gate, and means connecting the valve units together and operating to clamp said walls to the plate.

17. In a structure of the character described, two like relatively movable valve units, a plate confined between the units, each unit including, a body with a tubular flow conducting portion, coupling means at the outer end of said tubular portion, a flat inner end wall normal to the axis of said portion and having an outer side engageable with the plate, a flow controlling gate shiftable laterally of said tubular portion and engaging the inner side of said wall, a gate receiving chest projecting laterally from the tubular portion and closed at its inner end by said wall, the wall having a removable annular insert engaged by the plate and by the gate, an operating stem extending into the chest and carrying the gate, the gate being in substantial alignment with the stem, and means connecting the valve units together and operating to clamp said walls to the plate.

18. A valve including, an elongate body having a flow passage extending lengthwise therethrough from one end of the body to the other, a chest communicating with the passageway adjacent one end of the body and extending transversely of the body, a coupling part on the other end of the body, a disc-shaped gate operable in the chest into and out of position closing the passageway, a removable annular seat in the passageway at the first mentioned end of the body engageable by the gate and flush with said first mentioned end of the body, the seat being larger in outside diameter than the gate, a stem entering the chest, and a releasable coupling connecting the gate to the end of the stem with the gate substantially aligned with the stem transversely of the passageway, the gate being separable from the stem through said first mentioned end of the body when the seat is removed therefrom.

19. A valve including a unitary body having an elongate tubular section with a straight flow passage therethrough from one end to the other and a lateral extension with a gate receiving chamber communicating with the passage, the tubular section being counterbored from one end of the passage to the chamber, an annular seat mounted in the counterbore of the tubular section to be removable therefrom and having a seating face at the chamber, a unitary disc-shaped gate shiftable through the counterbored end of the passage and operable in the body into and out of engagement with the seat, cam parts in the body facing and spaced from the said seating face, an operating stem extending transversely of the tubular section for moving the gate between a position where it engages the seat and a retracted position in the chamber, and means confined to the upper edge portion of the gate releasably coupling the gate and said stem for withdrawal of the gate through the counterbored portion of the passage when the seat is removed, the gate having a flat front face cooperating with the seating face and having a pitched rear face cooperating with the cam parts.

20. A valve including a unitary body having a main section with a straight flow passage extending longitudinally therethrough and having a lateral extension with a gate receiving chamber, one end of the body having a plate receiving face on the main section surrounding the passage and having a portion on the said extension, said face being a plane normal to the passage, an annular seat removably mounted in the body from said end of the main section and having a seating face at the chamber and having its outer end flush with the said face of the body, a gate smaller in outside diameter than the seat and operable in the body into and out of engagement with the seat, a reciprocating stem extending laterally of the flow passage for moving the gate between a position where it engages the seat and a retracted position in the chamber, and releasable coupling means between the stem and gate including cooperating parts on the stem and gate engaged and released solely by shifting the gate relative to the stem in the direction of the flow passage, the gate being disc-like and being separable from the stem and removable from the body through the passage when the seat is moved from the body and the chamber being of such extent lengthwise of the passage as to receive the gate with only working clearance.

21. A valve including, a unitary body having a main section with a straight flow passage through it from one end to the other and a lateral extension with a gate receiving chamber, the main section being counterbored from one end of the passage to the chamber, an annular seat mounted in the counterbore of the main section to have a seating face at the chamber, a disc-like gate smaller in outside diameter than the seat and operable in the body into and out of position where one of its sides engages the seat, an operating stem extending into the chamber, and means for releasably connecting the gate and stem including a headed extension on the inner end of the stem engaged in a socket in the upper edge portion of the gate through an opening extending into the gate from its other side, the gate being removable from the body through the counterbore when the seat is removed therefrom.

22. A valve comprising a body having a straight flow passageway therethrough and having a gate recess communicating with and extending laterally with respect to said passageway, a gate retractible into said recess and movable therefrom to a position closing off said passageway, and a seat arranged in said passageway at one end thereof, the body having a planar face at the seat-carrying end thereof, said face extending from below said passageway to above said gate recess and the body having a peripheral flange encompassing said passageway and recess and on which a portion of the said face is located, the said peripheral flange having fastened receiving openings therethrough.

GORDON C. RALLS.

REFERENCES CITED

The following references are of record in the file of this patent:

UNITED STATES PATENTS

| Number | Name | Date |
| --- | --- | --- |
| 38,138 | Bond | Apr. 7, 1863 |
| 207,365 | Morse | Aug. 27, 1878 |
| 759,448 | Kiser | May 10, 1904 |
| 838,509 | O'Brien | Dec. 11, 1906 |
| 927,438 | Thomas | July 6, 1909 |
| 1,238,259 | Campbell | Aug. 28, 1917 |
| 1,555,075 | Pownall | Sept. 29, 1925 |
| 1,684,651 | Wayman | Sept. 18, 1928 |
| 1,893,602 | Stephens | Jan. 10, 1933 |
| 2,200,416 | Daniels | May 14, 1940 |
| 2,214,959 | Hamer | Sept. 17, 1940 |